P. F. PECK.
CENTRIFUGAL ORE SEPARATING APPARATUS.
APPLICATION FILED MAR. 28, 1910.
981,681.
Patented Jan. 17, 1911.
5 SHEETS—SHEET 1.
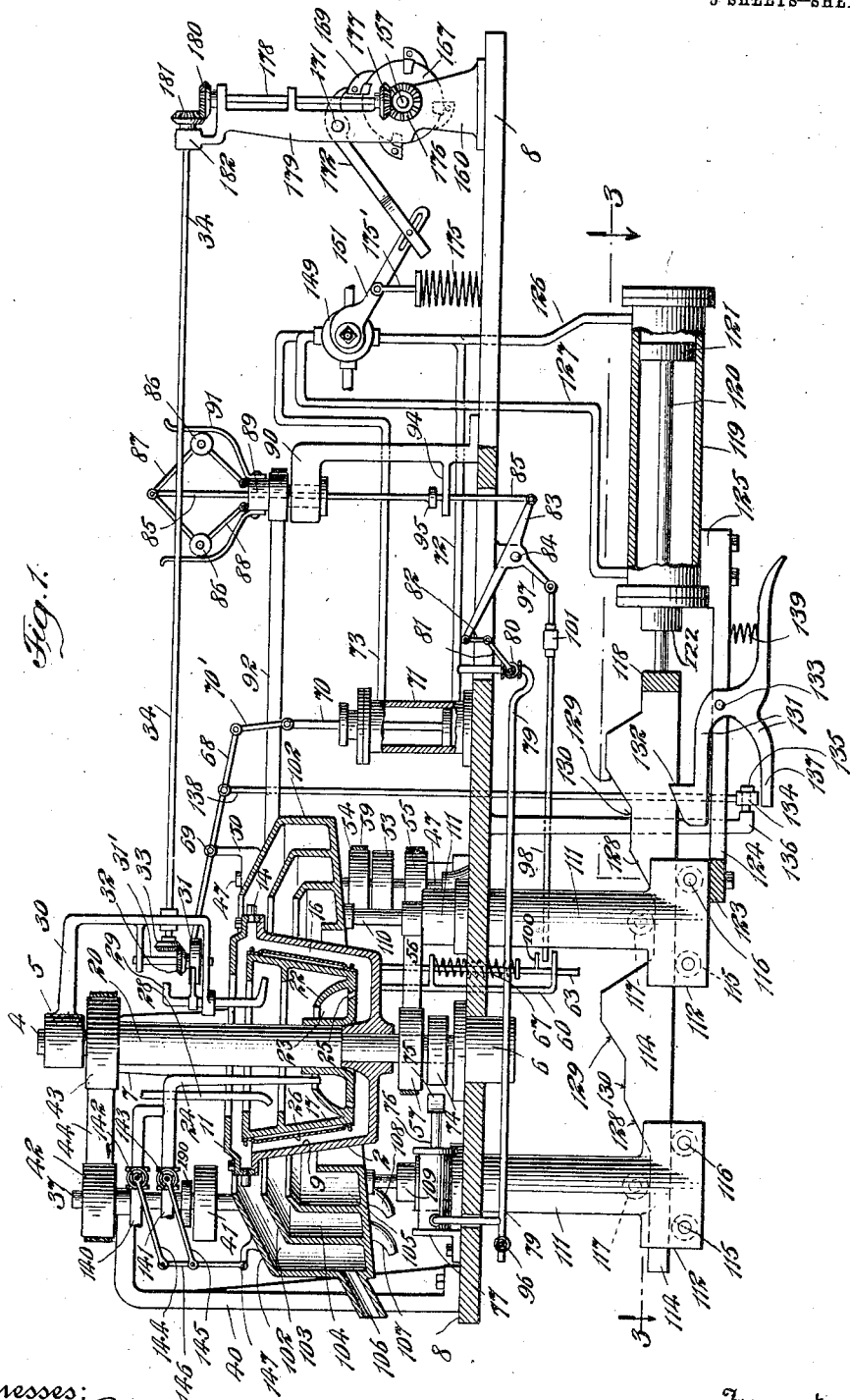
Witnesses:
Inventor
Philip F. Peck.

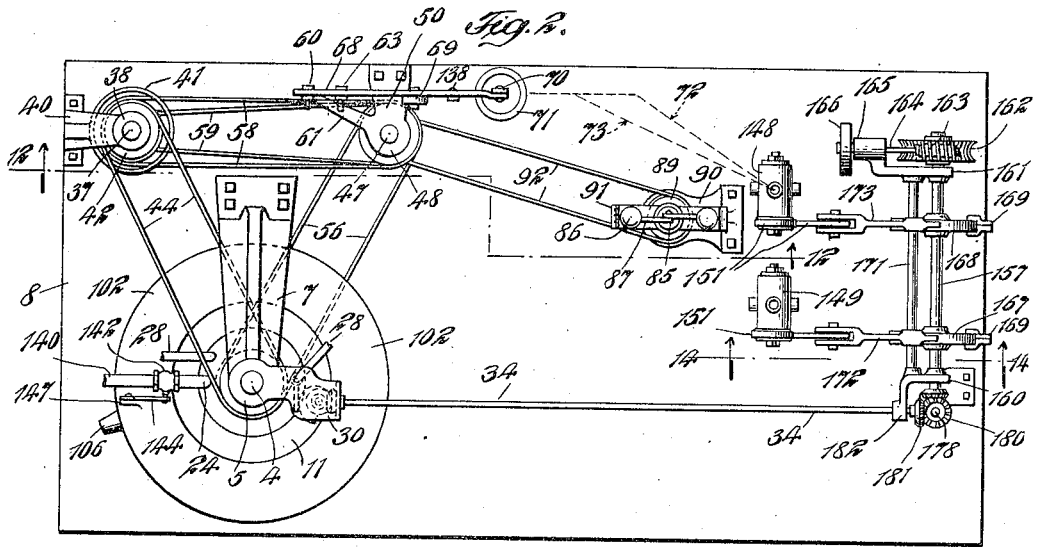
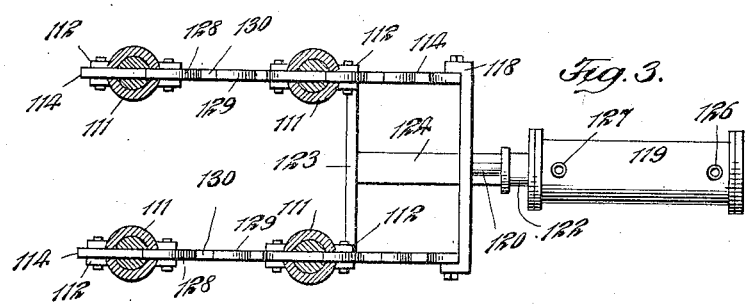
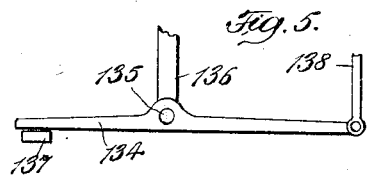
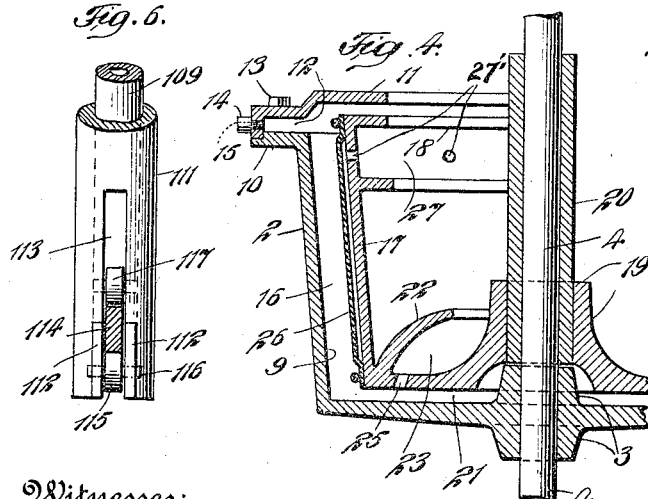
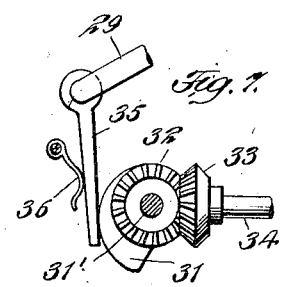

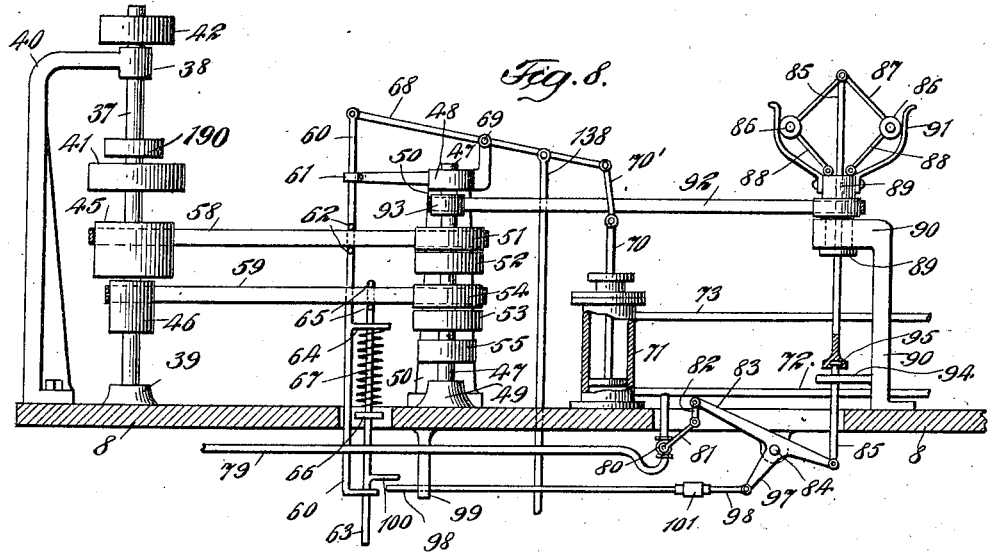

P. F. PECK.
CENTRIFUGAL ORE SEPARATING APPARATUS.
APPLICATION FILED MAR. 28, 1910.

981,681.

Patented Jan. 17, 1911

5 SHEETS—SHEET 4.

Witnesses:
Juliett Smith
John G. Campbell

Inventor
Philip F. Peck.

UNITED STATES PATENT OFFICE.

PHILIP F. PECK, OF TACOMA, WASHINGTON.

CENTRIFUGAL ORE-SEPARATING APPARATUS.

981,681.  Specification of Letters Patent.  Patented Jan. 17, 1911.

Application filed March 28, 1910. Serial No. 551,921.

*To all whom it may concern:*

Be it known that I, PHILIP F. PECK, a citizen of the United States, residing at Tacoma, State of Washington, have invented certain new and useful Improvements in Centrifugal Ore-Separating Apparatus, of which the following is a specification.

The objects of my invention are to provide a centrifugal separating apparatus for separation of heavier and lighter parts of ores and the like, while in a finely pulverized state, and mixed with water, of the general type illustrated in my U. S. Letters Patent Nos. 917,120; 917,121; 917,122 and 917,123, issued April 6, 1909, and to which belongs my pending application for Letters Patent for centrifugal ore separators, Serial No. 554,805, filed April 11th, 1910, cross reference to which is hereby made and which in substance, is claimed a vertically adjustable multi-chambered receptacle in combination with a centrifugal separating member of the kind described, and hydraulic and wedge shaped mechanism to effect adjustment of such receptacle, which is herein disclosed but not claimed, and my present invention relates to the coöperating combinations and associations of the parts and members of my apparatus to separately and conjointly effect purposes and results herein set forth.

Figure 14:
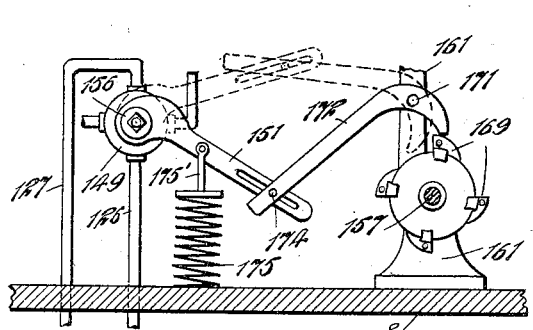
Figure 15:
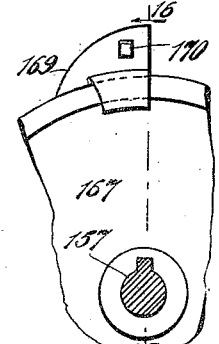
Figure 16:
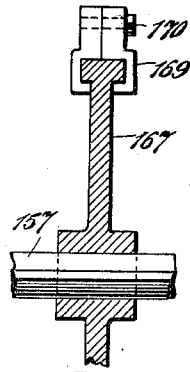
Figure 17:
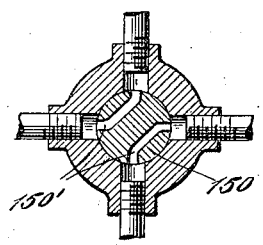
Figure 18:
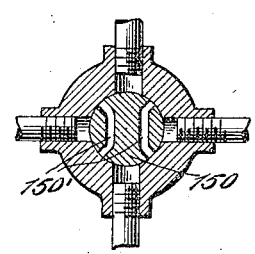
Figure 19:
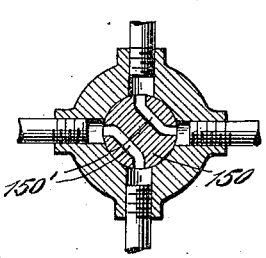
Figure 20:
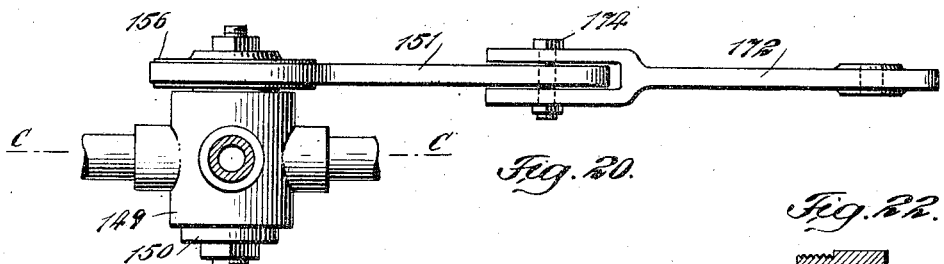
Figure 22:
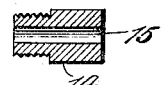
Figure 21:
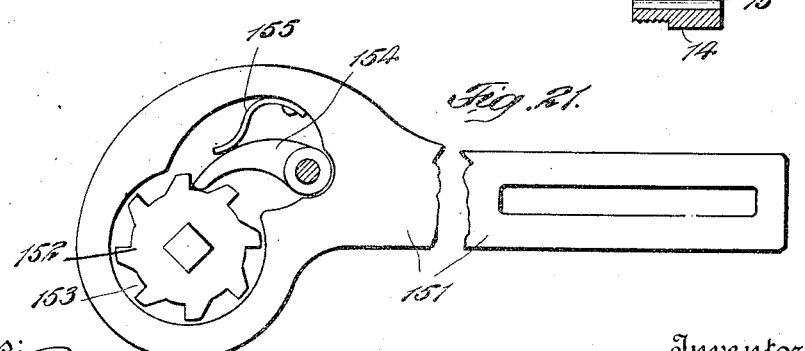
Figure 23:
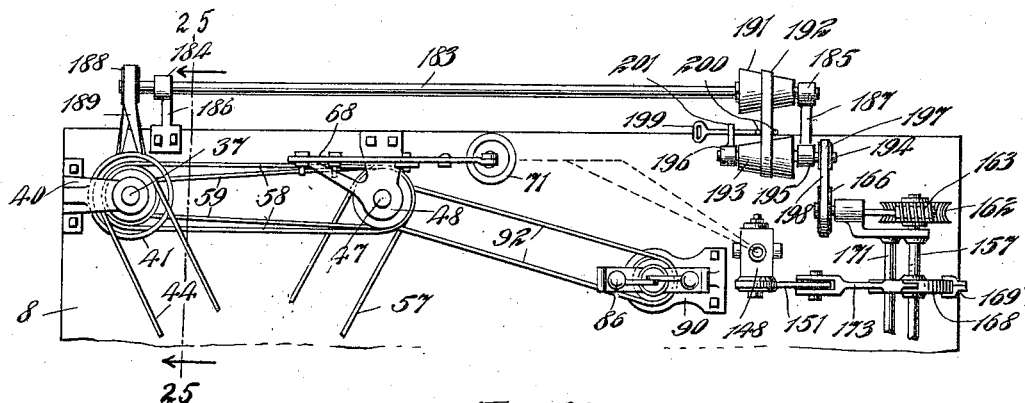
Figure 24:
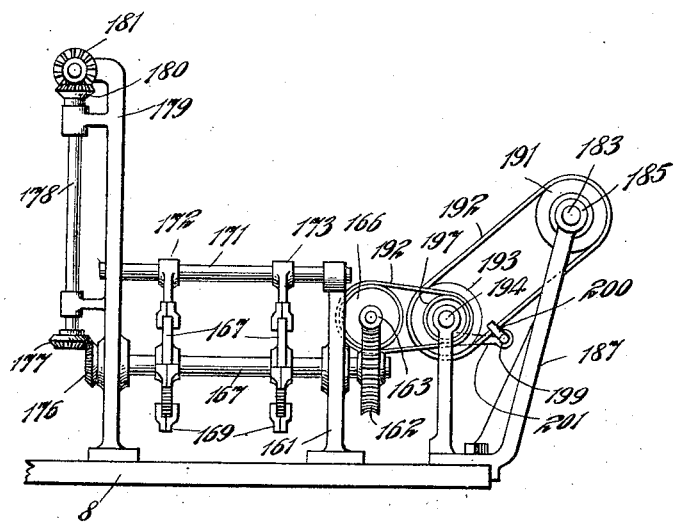
Figure 25:
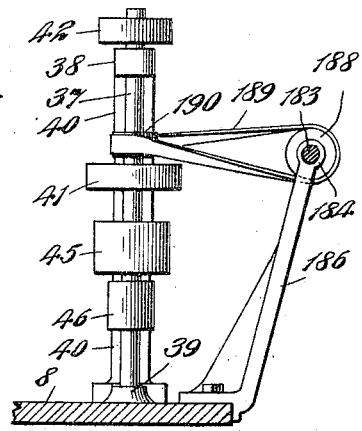

In the drawings Figure 1, is a longitudinal vertical central section of the launder, separating vessel, deflector and some other parts of my apparatus, and a side elevation of other parts, while the bed plate and some other parts are shown partly in central section broken back from portions shown in side elevation. From this figure the power drive for the control mechanism is omitted. Fig. 2, is a top plan of my apparatus except that part of the hydraulic pipes are omitted, and same are indicated diagrammatically in dotted lines. From this figure the power drive for the control mechanism is omitted. Fig. 3, is a section and plan showing parts mostly taken on line 3—3, of Fig. 1, looking in the direction of the arrows. Fig. 4, is mostly a central vertical cross section of a part of the separating vessel and deflector, enlarged from that shown in Fig. 1. Fig. 5 is a detail side elevation of a fulcrumed lever and some associated parts. Fig. 6, is an enlarged detail of the lower portion of one of the four columns, partly in side elevation turned ninety degrees from their positions shown in Fig. 1. Fig. 7, is a top plan of the cam with some of its associated parts shown detached from the separator. Fig. 8, is a section taken on line 8—8, of Fig. 2, looking in the direction of the arrows; it shows a side elevation of the vertical counter shafts with their tight and loose pulleys, and belt shifting mechanism, also a side elevation of the governor mechanism. A part of the bed plate is shown in longitudinal section and some other parts are shown in section. Fig. 9, shows a side elevation of the belt shifters with fragmentary parts of the belts in relative position to operate the separating vessel at high speed. Fig. 10, is a similar view to Fig. 9, but showing positions of both belts in position to be on their loose pulleys, and not transmit rotation to the vessel. Fig. 11, is similar to Fig. 9, only showing positions of the belts to operate the vessel at a low speed. Fig. 12, is an end elevation of the right hand end of my separator as shown in Fig. 1, looking to the left, principally showing the control mechanism. Fig. 13, is a longitudinal central plan section of the friction brake operating hydraulic cylinder. Fig. 14, is an enlarged detail taken on line 14—14, of Fig. 2, showing a portion of one of the four-way valves and part of the control mechanism in side elevation, with a fragment of the bed plate in section, also showing some other parts. Fig. 15, is a side elevation of a part of one of the disks of the control mechanism, and one of its attached movable dogs. Fig. 16, is a section of a part of the disk shown in Fig. 15, taken on line 16—16, of Fig. 15, looking in the direction of the arrows. Fig. 17, is a central cross section of one of the four-way valves of the control mechanism taken on line C—C, of Fig. 20, showing the liquid ports in position registering with two connected hydraulic pipes. Fig. 18, is similar to Fig. 17, only with the valve plug rotated forty-five degrees, showing communication closed between the ports and pipes. Fig. 19, is similar to Fig. 17, only showing the valve plug rotated one quarter around from its position shown in Fig. 17, so the liquid ports connect the other hydraulic pipes relatively ninety degrees apart. Fig. 20, is an enlarged top plan of a four-way valve, detached with its handle and associated lever. Fig. 21, is a side elevation of a part of a four-way valve handle with the side plate of its shank removed, showing its ratchet wheel and internal construction. Fig. 22, is a longitudinal central section of a discharge plug, removed and enlarged. Fig. 23, is a top plan of a part of my separating apparatus, showing the power transmission agencies and the variable speed means from the main driving shaft to the control mechanism. Fig. 24, is an end elevation of the right hand end of my separating apparatus shown in Fig. 2, but with a part of the base plate broken away, and also showing an end elevation of the speed transmission and regulating mechanism for the control agencies, connected in place, which are not illustrated in other figures, except in Fig. 23. Fig. 25, is an elevation of a part of my separating apparatus on line 25—25, of Fig. 23, looking in the direction of the arrows but with all of the belts excepting one, omitted.

To enable a better understanding of my invention and a clearer comprehension of its description in the specification, I desire to preliminarily state that my separating apparatus is of a nature contemplating that the separating vessel be alternately rotated at a comparatively high rate of speed to accomplish separation and accumulation of the desired quantity or load of concentrates; that during this time water be accumulated in the expansible element to suitably expand the same; that during this loading period, pulp be introduced for separation and the said water be properly removed from the expansible element to enable its gradual contraction; that after such load of concentrates is accumulated, the feed of pulp be stopped; that the feed of comparatively clean concentrates-removing water be introduced; that the speed of rotation of the separating vessel be considerably reduced to enable removal and discharge of accumulated concentrates; that the position of the launder be moved to appropriately receive said concentrates, after the load of concentrates is removed, that the high rotating speed of the vessel be restored and the launder moved to a position to again appropriately receive tailings; and the cycle of movements be repeated. It is further desirable to move and temporarily maintain the launder in an intermediate position to receive a middlings product from the separating vessel. To accomplish these coöperating movements and purposes relatively with certainty, precision and at the appropriate times, I have devised the relative associations and operating combinations of parts of my apparatus as illustrated in the accompanying drawings and described, and claimed therein.

In making my improved centrifugal ore separating apparatus, I provide a rotatable member 2, which is illustrated in the form of a vessel, and which serves as a separating vessel, having a closed bottom and open top. The bottom of the vessel has a central hub 3, (Fig. 4,) that engages rigidly a shaft 4, and is thereby supported, and rotated when desired. The shaft is mounted in journal boxes 5, and 6, respectively, to maintain it in position.

The journal box 5, is attached to a column or suitable frame part 7, mounted on the bed plate 8, and the box 6, depends down through the bed plate which supports it; the lower end of the shaft is stepped in the box 6, to carry its weight. The separating vessel 2, is turned and bored smoothly and concentrically to its shaft or axis, and on its inner peripheral wall is a separating surface 9, (Fig. 4,) over which the substance to be separated passes, as hereinafter described.

The top edge or rim of the open end of the separating vessel is formed into an outwardly extended flange 10, which flange has an annular recess at its outer top edge, into which the depending part of the ring or plate 11, (best shown in Fig. 4) is seated; this depending part being some greater in width than the depth of the annular recess in the flange 10, there is left between the ring and the flange, when the two are seated together, an annular space 12. The main part of the ring, or plate 11, is also made wide enough to extend inward some distance toward the axis of the vessel as illustrated, thereby partly closing the opening in the top of the vessel.

The separating vessel is preferably made with its walls and the separating surface inclined outward from its bottom to its top or open end, making it of greater diameter at this end, which is the discharge end of the vessel, and the ring 11, extends a greater distance toward the axis than the extent of outward slant, or inclination of the wall of the vessel, so that the bore or opening of the ring is less in diameter than the inner diameter of the bottom of the vessel, enabling when desired, a sufficient body of liquid to be retained in the vessel to fill the separating passage and submerge the separating surface, as hereinafter described.

The ring 11, is held in place on the flange of the vessel by the screws 13, which pass through it and are threaded into the flange. This ring around its wall, through its depending part is provided with a row of screw-threaded holes, communicating with the space 12, into which are removably screwed plugs or members 14, that are provided with small holes 15, shown best in enlarged sectional detail Fig. 22, of suitable size to permit of desired discharge of liquid and material, yet to retain a sufficient quantity of liquid in the vessel to fill the separating passage and submerge the separating surface, as above stated.

Located inside of the separating vessel 2, and with said vessel forming a separating passage 16, I provide a member to serve as a deflector, which preferably embodies a substantial non-elastic supporting element or portion 17, that I have illustrated in the form of a vessel, through this part may be any other suitable form of supporting structure, and I will in most places in the specification refer to this supporting element as the deflector vessel.

The deflector vessel has a closed bottom, and an open top, except that at its top is a ring 18, (Fig. 4,) flanged or extended a desired distance inward toward the axis of rotation. This vessel is somewhat smaller in diameter than the inside of the separating vessel 2, thereby leaving the separating passage 16, adjacent to the separating surface; it is also somewhat shorter than the inside of the separating vessel, and has a central hub 19, (Fig. 4,) which securely and rigidly engages the lower portion of a sleeve 20, that is mounted in a rotatable manner around the central shaft 4.

The lower end of the sleeve 20, rests in a rotatable manner on the upper end of the hub 3, and is suitably proportioned to hold the bottom of the vessels 2 and 20, apart, sufficiently to leave a comparatively small space 21, between them, as shown.

Within the deflector vessel, around its hub 19, I provide a ring 22, which rises above the bottom of this vessel, and forms a feed chamber 23. The ring, which I will term a feed ring, has a central opening at its top, sufficiently larger than the outer diameter of the hub 19, to leave a suitable annular space around the hub, through which liquid and material, as well as concentrate-removing water may be introduced into the feed chamber 23, by means of a pipe 24. The feed ring in this instance, is formed integral with the deflector vessel as shown in Figs. 1 and 4. Near the well of the feed chamber 23, I provide a number of holes 25, (Fig. 4,) through the bottom of the deflector vessel 17, which serve as material and liquid passages from the feed chamber down into the space 21, (Fig. 4,) whence such material and liquid, actuated by centrifugal force, are driven into the separating passage, where separation and concentration take place.

The deflector member, in addition to the deflector vessel, which serves as a supporting part 17, embodies an expansible and contractible element 26, which I will term an expansible element; it is in the nature of a covering or jacket, located around, secured to and supported by the deflector vessel. This element 26, is periodically expanded by liquid pressure, which is introduced into the annular trough 27, in the deflector vessel, and it serves the office of generating a frictional wash in the separating passage to assist in separation, and of regulating the size of the separating passage, which facilitates bedding of the concentrates as the same are separated. The expansible element also assists in intermittently removing and discharging such bedded concentrates, after such bed has sufficiently formed.

The pressure to which the liquid for effecting expansion of the expansible element is subjected, at a predetermined speed of rotation of the deflector vessel, and the resultant degree of its expansion, depends largely on the amount of liquid maintained in the trough 27, (Fig. 4,) in the deflector vessel, from the fact that such liquid forms the column which, acted upon by centrifugal force, effects a hydrostatic pressure substantially proportionate to its depth. This liquid for expansion may be introduced to the trough 27, by means of a pipe 28.

In order to secure a condition to satisfactorily accomplish separation it is necessary to have and maintain the frictional surface of the expansible element and the separating surface, or the surface of the bedding concentrates, in comparatively close operating proximity, and for the accomplishment of this, it is required that the expansion and contraction of the expansible element be gradually and suitably regulated throughout the loading period.

To best enable gradual contraction of the expansible element I have provided means for gradually removing the liquid from the annular trough 27, in the deflector vessel, thereby gradually decreasing the expansion pressure within the expansion chamber. For purposes of removing this liquid, I provide a suitable pipe or conduit 29, which I will term a scoop pipe. This pipe is bent so its scooping end is directed against the course of rotation, and is located to operate in contact with the surface of the revolving liquid in the trough in the deflector vessel, so that the liquid is scooped out and removed from the trough to the extent that the scooping end of the conduit is moved toward or from the axis of rotation of the vessel. The scoop pipe is suitably supported on a part of a bracket 30, in a manner to enable a rotating or swinging movement. Its upper portion is suitably bent to extend out over the top of the vessel, where it may connect with a hose, or other appropriate means of delivery of the liquid removed.

As means of fixing the position of the scooping end of the scoop pipe, and of traveling it toward and from the axis of the vessel, thereby governing the amount of liquid in the trough 27, of the deflector vessel, as illustrated in Figs. 1, 2 and 7, I provide a cam 31, rotatably supported on a shaft 31', journaled upon a part of the bracket 30; and to the cam, as best shown in detail Fig. 7, is connected to a bevel gear wheel 32, engaging a similar gear wheel 33, which is mounted on, and revolved by a shaft 34.

The peripheral contour of the cam is suitably made to effect the desired swinging movement of the scoop pipe, the upper bent end portion of which is located so that an attached finger 35, will contact with the cam and be deflected by it. This finger is held against the surface of the cam by a spring 36, (Fig. 7), suitably located for that purpose. This end of the shaft 34, as well as the cam, the scoop pipe and gear wheels 32 and 33, are suitably supported by the bracket 30. The opposite end of the shaft 34, extends to, and is connected with, rotated by, and in step with the general controlling mechanism of the separating apparatus, as hereinafter more particularly described, so that the means for regulating the expansion and contraction of the expansible element will be operated in step, conjointly and in harmony with other parts and movements of the separating apparatus.

It will be understood that the peripheral contour of the cam, is formed to produce the desired swinging movement of the scoop pipe, to suitably remove the expansion water from the deflector vessel.

As means for rotating the vessel at the respective desired predetermined speeds, appropriate for concentrating and for unloading, and of changing or assisting to change from one of said speeds to another, I have provided a preferably vertical counter-shaft 37, best shown in Figs. 2 and 8, which is maintained in position by journal boxes 38, and 39, the former box, on the upper part of the supporting bracket 40, and the latter box, on the base plate 8. On this shaft 37, I have mounted a pulley 41, adapted to receive motive power from any suitable source, that may be transmitted to it by means of a belt (not shown).

On the upper end of the shaft 37, I have secured an appropriate pulley 42, in suitable alinement with an appropriate pulley 43, located on the upper end of the sleeve 20, and have connected these two pulleys together by a belt 44, so the sleeve and deflector vessel will be rotated when the shaft 37, is rotated.

In addition to the pulleys 41, and 42, I have suitably located and rigidly mounted comparatively wide faced pulleys 45 and 46, on the shaft 37, one of which is preferably considerably larger in diameter than the other. At a suitable distance from this shaft 37 I have located a vertical shaft 47, mounted in journal boxes 48 and 49, as illustrated; the former box being attached to the upper end portion of a bracket 50, and the latter box, on the bed plate 8.

On the shaft 47, in suitable belt alinement with the pulley 45, and to be operated by it, I have located a tight pulley 51, of appropriate width, and also close to it, a loose pulley 52, and to be operated from the pulley 46, I have in like manner, mounted on the shaft 47, a tight pulley 53, and a loose pulley 54. On this shaft 47, I have also rigidly mounted a suitable pulley 55, in position to connect by a belt 56, with and drive a pulley 57, on the shaft of the separating vessel, as shown in Fig. 1, so that the rotating speed will be imparted to the vessel.

The shafts 37, and 47, are connected by belts 58 and 59, which are adapted to be shifted up or down to properly operate on their respective tight or loose pulleys, and inasmuch as the pulley 45, is larger than the one 46, the speed at which the shaft 47, and consequently the separating vessel will be rotated, depends upon whether the belt 58, or the belt 59, is operating on its tight pulley on the shaft 47. In case both of these belts are operating on their loose pulleys at the same time, they will not, at such time, impart actuating energy to the shaft 47, and the separating vessel, but the shaft 47, will at this time, through the medium of the belt 56, be actuated by the vessel if the vessel is then rotating by its momentum. The relative positions of these shafts and the separating vessel are best shown in top plan in Fig. 2.

As means for shifting the belts 58, and 59, at the appropriate and desired times, in harmony with other operating parts of my separating apparatus, I provide a rod 60, as is best illustrated in Figs. 8, 9, 10 and 11, in suitably close relation to these belts, which rod is supported in a guide 61, and also by passing through the bed plate, and from this rod there are extended fingers or pins 62, between which the belt 58, passes. Adjacent to and parallel with the rod 60, is located a second rod 63, suitable for the purposes intended. This rod is held in position at its top part by passing through a finger 64, from the rod 60, and at its lower end, by passing through the lower bent end of the rod 60, in a manner susceptible of being moved longitudinally through these guides.

From the rod 63, there are extended fingers 65, located and adapted to have the belt 59, properly passed between them, and to serve as guides to the operating position of this belt. There is also suitably located on the rod 63, a boss, flange or stop 66, against which rests the lower end of a suitable spiral spring 67, which is coiled around the rod 63. The upper end of this spring contacts against the extended guide finger 64, which serves as a stop to its upper end. This spring is at all times intended to be in a state of greater or less compression, depending on the relative positions of the two rods, and its extension is limited by the stops 64 and 66.

The upper end of the rod 60, is sufficiently extended and is pivotally connected to the end of a fulcrumed lever 68, which is suitably located, and is fulcrumed at 69, as best shown in Fig. 8, to a part of the bracket 50. The other end of this lever is connected through a link 70', to the upper end of a piston rod 70, of a hydraulic cylinder 71; the piston rod is provided with a suitable piston head, and is adapted to be traveled lengthwise and rock the lever and move the rods 60 and 63, to shift the belts as hereinafter further described. The cylinder 71, is suitably provided with hydraulic pipes 72 and 73, to supply liquid for traveling the piston rod at the appropriate times, which is suitably predetermined and effected through the general control mechanism hereinafter explained, these pipes 72 and 73, are diagrammatically indicated in dotted lines in Fig. 2.

It will be understood that during the loading period of the separating vessel, the belt 58, will be operating on its tight pulley 51, and the belt 59, will be operating on its loose pulley 54, and when it is desired to lessen the speed of the vessel to enable an unloading condition, if the relative positions of these belts with respect to their tight and loose pulleys were quickly shifted or changed, the belt 59, would have to slip on its pulleys under stress of the high momentum of the separating vessel, until the belt had sufficiently decreased the rotating speed of the separating vessel, to be properly driven by this belt 59. This slipping would have a damaging effect on the belt, and also tend to unduly strain the driving mechanism, and, moreover, reduction of speed of the vessel would not be effected as quickly as might be desired. In order, therefore, to remove the necessity of procuring reduction of speed of the separating vessel by means of the belts, and to more quickly accomplish such reduction, I have provided the shaft of the separating vessel with a suitable friction disk 74, (Fig. 1), rigidly secured to this shaft near its lower journal box, and in position to frictionally operate on the peripheral surface of the disk, there is provided a suitable friction shoe 75, adapted to be carried against the disk by a piston rod 76, extending from a suitable, properly located hydraulic cylinder 77, which is secured to the bed plate of the separating apparatus. This cylinder is illustrated in position in side elevation in Fig. 1, and in central longitudinal plan section in detail Fig. 13, the latter figure showing some internal parts.

The piston rod 76, within the cylinder, is attached to a suitable piston head 78, (Fig. 13,) adapted to be actuated by hydraulic pressure and move the rod and friction shoe against the friction disk 74.

The cylinder 77, is provided with a suitable hydraulic pipe 79, connecting near its end portion opposite to the entrance of the piston rod, so water introduced to the cylinder, under pressure, will exert pressure on the friction shoe for decreasing the rotating speed of the separating vessel.

Within the cylinder 77, at the end where the piston rod enters, and around its piston rod is a suitable coiled spring 78', with its ends resting against that end of the cylinder and the piston head respectively. This spring at all times exerts a pressure to remove and hold the friction shoe from contact with the friction disk and serves to force the shoe out of such contact while it is not being forced into contact by the hydraulic pressure in the cylinder. The hydraulic pressure in the cylinder, and resultant frictional contact prevails while the rotating speed of the vessel is being reduced preparatory to unloading concentrates.

The hydraulic pipe 79, extends to and is connected with the pipe 72, which, as hereinafter explained, during the time of reducing the rotating speed of the separating vessel, contains liquid under desired pressure to operate in the cylinder 77. The pipe 79, has a valve 80, suitably located in it, with its handle 81, connected by a link 82, to one end of a lever 83, which is fulcrumed to the bottom side of the bed plate at 84. The opposite end of this lever 83, is connected to the lower end of a reciprocable rod 85, so the valve will be operated through the movement of this rod 85. The valve serves to stop the flow of water to the cylinder 77, when the separating vessel has been sufficiently reduced in speed, as herein below explained.

As means of operating and governing the valve 80, so frictional contact and pressure will be maintained on the friction disk until the desired predetermined degree of speed reduction is reached, and at that time be released, there is provided and suitably located, a governor having balls 86, coupled in a hinged manner by links 87, to the top end of the reciprocatable rod 85. The balls are also coupled by links 88, in a hinged manner, to a part 89, which is rotatably maintained in a vertically fixed position by the upper portion of a supporting bracket 90.

The rod 85, slidably extends down through the part 89, and to this part there are rigidly secured the lower ends of two suitable flat springs 91, which extend upward and contact respectively against the outer sides of the governor balls, as illustrated, tending to force the balls toward the axis, and through the several links, to carry the rod 85, upward.

The part 89, is provided with a suitable belt surface around which a belt 92, passes from a pulley 93, which is located on the shaft 47, thereby rotary motion is transmitted to the governor balls and springs, when the shaft 47, is being revolved, and inasmuch as high speed of revolution of the balls develops a high degree of centrifugal force, and forces the balls outward against the restraining tendency of the springs, thereby traveling the rod 85 downward, and at a comparatively slow speed of revolution of the balls, they are forced inward by the springs, carrying the rod 85, upward, it follows that the degree of rotating speed of the shaft 47, will govern and fix the vertical position of the rod 85, for purposes hereinbelow more fully described.

There is a suitable guide 94, (Figs. 1 and 8,) provided to assist in supporting the rod 85, and such rod is provided with a suitable swivel joint 95, so its upper part may rotate freely and its lower part be non-rotatable. The construction of said swivel joint is shown most clearly in Fig. 8.

The lower end of the rod 85, is pivotally connected to the fulcrumed lever 83, and to the other end of this lever through the link 81, is hinged the handle of the valve 80, as before explained, so that by vertical travel of the rod 85, through action of the governor, the valve 83, will be opened or closed, as the case may be, the valve 80, being located to become closed by upward movement of the rod 85, which is accomplished by the low speed of rotation of the balls, resulting from low speed of the shaft 47.

Reduction of the speed of the governor to a point sufficiently low to effect closure of the valve 80, is predetermined to occur at a time when the rotating speed of the separating vessel has become sufficiently reduced by the friction shoe 75, for unloading concentrates. At that time, by closure of the valve 80, through movement of the ball governing mechanism, supply of liquid under pressure to the cylinder 77, will cease, and a sufficient amount of the liquid then in such cylinder will escape through the vent valve 96, enabling the spring 78', to quickly force the piston rod to carry the shoe 75, from frictional contact with the friction disk.

The reduced speed of rotation of the separating vessel, at which the governor will effect closure of the valve 80, is intended to be the speed that the vessel will be driven by the belt 59, when such belt is operating on the tight pulley 53.

It will be understood that the governor will be operating at a high speed of rotation during the loading or concentrating period, and the rod 85, will then be forced and held downward, holding the valve 80 open, but during this period there will be no liquid pressure in the pipe 72, so there will be no liquid supplied to the cylinder 77, and no actuating effect on the friction shoe. The speed reducing effect above explained will commence just after water under pressure is introduced into the pipe 72, which will occur at or shortly after the end of the loading period as hereinafter more fully stated.

To the lever 83, is fixed a suitable extended arm 97, which is moved as the lever is rocked by the movement of the rod 85, and to the opposite end of this arm is hinged the end of a rod 98, best illustrated in Figs. 1 and 8. This rod extends through a guide 99, in position so the end of the rod opposite to the arm 97, will pass slightly under and support a finger 100, fixed to the lower portion of the belt shifting rod 63, as long as the rod 98, is moved and held longitudinally in that direction, but in a manner, when the end of this rod 98, is withdrawn from under the finger 100, the belt shifting rod 63, will be permitted to travel downward, forced by the spring 67, provided the rod 60, has previously been traveled downward and is then in a down position, as illustrated in Fig. 10. The rod 98, is provided with an ordinary turn buckle 101, so its length may be adjusted. It therefore follows that the governing balls, through the agencies described, regulate the shifting of the belt 59, to drive the separating vessel at the desired low speed for unloading purposes. This shifting occurs substantially at the time the valve 80, closes the water off from the hydraulic cylinder 77, and releases the friction shoe 75, the two movements being effected in relative harmony.

When the separating vessel has accumulated a load of concentrates and the time has been reached to discharge them, it will be understood that the vessel is being rotated at its high speed through the belt 58; and at this time there will, by means of the general hydrostatic or hydraulic control mechanism hereinafter described, be water under pressure introduced to the pipe 72, so that through agencies of the hydraulic cylinder 71, and lever 68, herein already described, the belt shifting rod 60, will be moved downward, and travel the belt 58, to operate on the loose pulley 52, so that both of the belts 58 and 59, will be on their loose pulleys, and the vessel, through its momentum will be driving the shaft 47.

As the belt shifting rod 60, is moved downward, the belt shifting rod 64, will be prevented from moving downward by the end of the rod 98, contacting under the finger 100, as above explained, and as a result, the spring 67, will be compressed by the finger 64, moving downward on top of it, which position is illustrated in Fig. 10, and from the further fact that the valve 30, is at this time, being held open through the energy of the highly rotating governor balls, and there will then be liquid under pressure in the pipe 72, with which the pipe 79, connects, such liquid will be admitted to the cylinder 77, and the friction shoe applied to reduce the speed of the vessel. The governor is being driven at this time by the momentum of the vessel through the agencies described, so that this condition will continue until the vessel speed has been sufficiently reduced to slacken the governor's rotation to effect closure of the valve 80, enabling backward movement of the friction shoe, and at the same time, by reason of such slackened speed, the rod 98, will be sufficiently moved to withdraw its supporting end from under the finger 100, thus permitting the belt shifting rod 63, to be traveled downward by energy of the compressed spring 67, carrying with it the belt 59, to operate on its tight pulley 53, and thereby actuate the vessel at the predetermined reduced speed for unloading purposes.

The unloading speed will continue for the time predetermined, in which the concentrates will be removed and discharged, when substantially at this same time, through reversed movement of the piston rod 70, by water introduced for that purpose, timed by the general control mechanism hereinafter described, the lever 68, will be rocked to draw the belt shifting rod 60, upward, bringing with it, the rod 63, by reason of the latter's engagement with the lower crooked end of the rod 60, and shift the belt 58, to operate on its tight pulley 51, and the belt 59, to operate on its loose pulley 54, so the belt 58, will quickly restore, and again drive the separating vessel at the high speed for effecting concentration. This increased speed, will increase the speed of rotation of the governor balls, which will effect movement of the rod 98, so its end will again be in position under the finger 100, of the belt shifting rod 63, and will again open the valve 80, in position to permit flow of water into the hydraulic cylinder 77, to operate the friction shoe, when again desired, but during the separating period, and until it is desired to again reduce the speed of the vessel, liquid will be closed off from the pipes 72, and valves 80, by the general controlling mechanism as above stated.

The several positions of the belt shifting rods and their belts are shown in Figs. 8, 9, 10 and 11. Figs. 8 and 9, show the shifting rods, and fragmentary parts of their belts in position for the belt 58, to drive the vessel at the high, or separating speed. Fig. 10, shows the relative position of both belts operating on the loose pulleys, and the vessel running by its momentum, and Fig. 11, shows the belt to operate the vessel at its low or unloading speed.

It will be understood that both the tailings or waste material and the separated concentrates are dischaged from the separating vessel through the same discharge holes in the several plugs 14, but at different times; the former during the loading or concentrating period and the latter during the unloading period, and between these periods it is usually advantageous to remove, discharge and collect separately a comparatively small intermediate or middlings product, which is largely made up of the material in transit through the separating vessel at the time and immediately after the flow of pulp to the vessel is discontinued preparatory to unloading concentrates, this product is also discharged through the same holes as are the tailings and concentrates.

As means for catching and receiving the tailings or waste, the middlings and the concentrates separately, while being discharged from the separating vessel, and to deliver them separately for further disposition, I provide a suitably shaped, preferably metal launder 102, having separate annular compartments, 103, 104 and 105, which are intended and adapted to receive tailings, middlings are concentrates, respectively. Each of these compartments is provided with an annular opening at its upper extremities, in the direction toward the axis of the vessel, which is of size and suitably located with respect to the discharge plugs 14, in the vessel, so when the launder, during operation, is moved to its different positions, as hereinafter described, materials being discharged from the vessel will be delivered into the particular compartment desired to receive it. These annular compartments in the launder are provided with discharge passages through their respective spouts 106, 107 and 108, for the flow of material and water from them.

As means for moving the launder in appropriate relative positions so each compartment will receive the particular material designed for it, I provide hollow supporting posts 109, having rods 110, extending upward from out of the opening in each of the upper ends of the posts, being suitably secured therein, with their upper ends attached to the bottom side of the launder, thereby holding it in position as well as supporting its weight. The posts pass in a sliding or travelable manner, through hollow guide columns 111, which are suitably bored to nicely receive and hold the posts in place and in alinement, permitting them to be slid up and down as desired. There are preferably four of these columns 111, which extend some considerable desired distance through and below the bed plate, as illustrated, to which plate they are secured. They preferably have laterally extended or protruding wings or ears 112, at their lower ends, with slots 113, between the ears. The slots extend a suitable distance up through the columns; which position is shown more clearly in detail in Fig. 6.

The posts 109, preferably extend down into the columns to the bottom portions of the latter and each post has a slot in its lower portion, corresponding to and registering with the slot in its respective column. These columns are suitably relatively located so a bar 114, may be inserted and slid or traveled through the slots of two columns and posts at the same time, as illustrated. In the slots between the ears I have provided rollers, 115, held in place respectively by pins 116, and in position to travelably carry or support the bar members 114. In each of the slots in the posts, I have provided a roller 117, somewhat above the rollers 115, and in position to rest and roll on the top side or surface of its respective bar, thereby serving as means to support the posts, which in turn, serve as means through the instrumentality of the rods 110, to support the launder. As is illustrated, these bars or members 114, are preferably smooth and even on their lower sides, and are of suitable width and adapted to enter and be traveled through the slots 113, in the columns, and over, and be supported by the several rollers 115, and at the same time to pass through the slot in the posts and under and to support the rollers 117, as above stated. There are preferably two of these bars or travelable members, each passing through the slots of two of the columns and posts, which are located in suitable relative alinement, as already stated; to permit of this, and to enable and insure a concerted movement, the two bars are preferably secured together by a cross piece 118, as shown best in Fig. 3. To actuate or effect travel of these bars, I have provided a hydraulic member or cylinder 119, with its piston rod 120, at one end, carrying a suitable piston head 121, while its other end extends out of the cylinder through an ordinary suitable packing box 122, and engages the cross piece 118, as illustrated; so, as the piston rod is moved by hydraulic pressure in the cylinder, the bars 114, will be correspondingly traveled.

As means for holding the cylinder in place I have provided a cross stay 123, shown best in Fig. 3, secured to the lower ends of the columns, and have extended a bar 124, Figs. 1 and 2, from it to the cylinder securely engaging the cylinder 125.

The hydraulic cylinder on member 119, is provided with suitable pipes 126 and 127, adapted to supply actuating liquid to the cylinder, the flow of which is controlled by valve mechanism hereinafter described, operated through the general controlling mechanism, so that at desired times, liquid under pressure will be introduced in the appropriate end of the cylinder to drive the piston rod in the direction it is intended to actuate or travel the bars 114, with their attached mechanism.

As is most clearly illustrated in Fig. 1, the upper surfaces or edges of the bars are provided with multiple wedge-shaped or inclined portions 128 and 129, and with straight portions 130, interposed between the wedge-shaped portion; the straight portions have their surface substantially parallel to the bottom sides of the bars, and to the course of their travel.

The wedge-shaped portions, as well as the interposed straight portion are so relatively located and are also located with respect to the rollers 117, in the different posts through which they travel, that the several rollers will at the same time pass over the same relative portions of the wedges or straight portions, resulting during the time the wedge portions are traveling under the rollers, in movement of the posts relatively the same, carrying the launder up or down as the direction of the wedge movement may be, and during the time the rollers 117, are traveling over the straight portions 130, of the bars, the posts and launder will not be moved.

The heights of the wedges and the distance or spacing between the centers of the annular openings of the several compartments in the launder, are intended to be substantially the same so the vertical movement of the launder, caused by the travel of the wedges, will be proper and adapted to move the launder so these annular openings will respectively be in suitable alinement to receive materials being discharged through the plugs 14, from the separating vessel.

As means for temporarily stopping or arresting the travel of the bars 114, with their wedge mechanism at the time when the rollers 117, are passing over the straight portions interposed between the wedges, and thereby maintain the launder in position to receive material in the central compartment 104, I have provided a forked lever 131, having a shoulder 132, near one end, and being fulcrumed at 133, in position for this shoulder to engage and retain the cross bar 118, in its movement, and thereby stop the travel of the piston rod 120, and parts actuated by it, until through the extended opposite or handle end of the lever 131, the retaining shoulder is drawn downward out of engagement and releases the cross bar, which enables the piston and parts actuated by it to resume movement to the limit of their travel.

As means for automatically, and at the appropriate times, deflecting the shoulder end of the lever 131, out of retaining engagement with the cross bar 118, I provide a lever 134, (Figs. 1 and 5,) in suitable position, extending in a direction crosswise of the bed plate of the separating apparatus, and near the center of this lever, at 135, I fulcrum it to a suitable supporting rod 136, depending from the bottom side of the bed plate.

The lever 131, is provided with a lower prong 137, and one end of the lever 134, passes above this prong, as illustrated in Fig. 1, in position to force the shoulder end of said lever 131, to carry its shoulder 132, downward out of engagement with the cross bar 118, when the lever 134, is suitably rocked. The opposite end of the lever 134, pivotally engages a rod 138, which extends upward through the bed plate, and its upper end is pivotally connected to the lever 68, (Figs. 1, 2 and 8,) which lever 68, is, at desired predetermined times, rocked by movement of the piston rod 70. It will therefore follow that resumption of the arrested movement of the launder and its hydrostatic actuating mechanism, will be automatically accomplished through energy in the cylinder 71, which will be suitably predetermined, timed and effected through the general control mechanism of the separating apparatus.

It will be understood that the movement of the piston rod 120, and parts that it actuates is arrested only in the direction of entering the wedges, which accomplished upward movement of the launder, but is uninterrupted in their travel in the opposite direction. The cross bar 118, while traveling in the latter direction passes over the shoulder end of the lever by diverting it downward. The spring 139, serves to hold the lever in its position for arresting the travel of the cross bar, and of restoring such position after the lever is diverted otherwise.

As means of supplying pulp to the separating vessel, and also concentrate-removing water when desired, I provide the suitable feed pipe 24, extending down into the feed chamber 23, as before explained, and for supplying this feed pipe 24, at suitable times with the pulp, and concentrate-removing water there are branch pipes 140 and 141, respectively, connected to it, and to govern the flow in these branch pipes there are valves 142, and 143, provided with handles 144 and 145, which are relatively located and hinged, through a connecting link 146, to the launder 102, as shown at 147, so when one valve is open, the other is closed, and by predetermined movement of the launder, they assume opposite relative positions.

The valves are so connected to the launder and are in such relative positions that they will be suitably and automatically opened and closed through the movements of the launder, to introduce pulp for separation and concentrate-removing water at the appropriate times with respect to the positions of the launder. These movements are preferably so that the compartment 103, will catch the tailings, while pulp is being fed to the vessel; the compartment 104, will receive middlings immediately after stoppage of feed of pulp, and the compartment 105, will receive concentrates while concentrate-removing water is being introduced, and the vessel unloaded.

As means for regulating and governing the flow of actuating liquid to the hydraulic cylinders or members 71 and 119, I provide a four-way valve 148, for the cylinder 71, (Fig. 2,) and a four-way valve 149, for the cylinder 119. Each valve is provided with a rotatable plug 150, having two suitable liquid ports or passages 150′, through it. These ports are illustrated in the cross section Figs. 17, 18 and 19, which are taken on line C, C, of Fig. 20; they illustrate the valves with short pieces of hydraulic pipes attached, the outer ends of the pipes shown broken away.

The several ports, by rotation of the valve plugs, will be brought into position to communicate with the different hydraulic pipes for diverting the actuating liquid to operate in the particular part of the hydraulic mechanism at predetermined times, and govern or control the movements of the separating apparatus.

In the assembling of the hydraulic pipes, with the four-way valves, the pipes from the opposite ends of the cylinder connect to their respective valves in positions diametrically opposite, as shown in the several detailed figures, while the liquid supply pipe and the liquid escape pipe connect at points relatively opposite. The two pipes from the respective cylinders alternately serve between their valves and the cylinders as supply pipes and escape pipes, governed by the position of the valve plug, depending on which way it is desired at the time to move the particular piston rod and mechanism which it actuates.

As means to rotate the valve plugs as desired, I have provided each of the four-way valves with a handle 151, securing them on the extended ends of the plugs, as shown especially in Figs. 2 and 20, and to adapt the handle to the purposes wished. I provide its shank, or end engaging the valve plug, with an internal ratchet wheel 152, having eight teeth 153, Fig. 21, and have provided it with a pawl 154, held in position against the wheel by a spring 155.

The ratchet wheel is provided with a square hole through which the end of the valve plug, which is also square, passes so that the valve plug will be revolved as the ratchet wheel is turned. The purpose of providing the ratchet wheel with eight teeth is to insure the suitable amount of rotation of the plug by predetermined approximate movement of the handle, so the plug will open and close its ports as the case may be, with certainty, in the manner intended; these teeth are preferably located on the ratchet wheel at points relatively equidistant. The ratchet wheel has a sufficiently large plate 156, on each side of it to hold it in position within the handle, and also to assist in holding the handle in place on the plug, the plate is held in place by the retaining nut, threaded on the extended end of the plug, as especially illustrated in Fig. 20. As means for operating these four-way valves through their handles, thereby governing the supply of liquid to the several hydraulic cylinders which actuate parts of the separating apparatus, I provide general controlling mechanism, having a suitable shaft 157, rotatably journaled on supporting brackets 160, and 161, from the bed plate of the apparatus.

The shaft 157, is adapted to be slowly revolved by a worm wheel 162, mounted on one end of the shaft, and is engaged by a worm 163. This worm is carried and rotated by a shaft 164, which is journaled in a suitable box 165, and is driven by a pulley 166, which it rigidly carries. The pulley 166, may be rotated by any desired suitable means.

The speed of rotation of the shaft 157, and the parts it carries is intended to be very slow, only making one revolution during a full period or cycle of concentration and unloading of the separating vessel and the movements of its allied parts, so the rotation of the pulley 166, must be proportioned accordingly.

Inasmuch as it will be advantageous or necessary to vary the period of loading or concentrating for different materials, without changing the rotating speed of the separating vessel, which will require relative change between the speed of that vessel and the pulley 166, this pulley may with advantage and preferably be coupled, through suitable transmission agencies, including variable speed means, to the shaft 37, or otherwise, so the parts actuated by the pulley 166, will be driven by the prime mover of the separating apparatus, and the relative variation required can be effected through the interposed variable speed means, resulting also in change in the operating cycles of the separating apparatus.

Securely mounted on the shaft 157, and rotating with such shaft, I provide disks 167 and 168, one of these disks being located with respect to each of the four-way valves, and on these disks are movably located dogs or parts 169, which have inclined or outwardly divergent peripheral surface portions, and also abruptly receding or square shoulder portions, similar to ratchet teeth, as illustrated. These dogs may be made of two parts, and the parts clamped together on the outer rim of the disks and tightly held there in place as desired, by screw bolts 170, as best illustrated in detail Figs. 15 and 16. There are preferably four of these dogs on each disk.

The dogs may be placed or located on each disk with relation to each other as desired, and also with respect to those on the different disks to obtain actuating effect on the different four-way valves at the appropriate relative predetermined desired times, for effecting movements of the several parts of the separating apparatus in coöperating harmony.

As means for transmitting movement to the four-way valve plugs through their handles, there is preferably a shaft 171, provided, suitably located and supported by the brackets 160 and 161, on which suitable levers 172 and 173, being preferably forked at one end, as shown in Fig. 20, are located in positions to engage, by bolts 174, with the ends of the handles 151, of the valves 148 and 149, respectively, as illustrated. These levers have one of their ends crooked as illustrated, to bring these ends into position to approach closely to the diametrical surface of the disks, so that, during revolution of the disks, these crooked ends will be deflected upward while passing over the inclined surface of the dogs, and will be released quickly as the shoulder side of the dogs are passed. The deflected movement caused by the dogs will force the opposite end of the lever downward, and with it the connected valve handle, compressing a suitable spring 175. As the shoulder on the dog is passed, and the lever released, the valve handle will be forced upward by its compressed spring 175, and carry that end of the lever upward in position shown in dotted lines in Fig. 14. The handle, at the same time, through instrumentality of its ratchet mechanism, will revolve its valve plug about forty-five degrees, either opening or closing the liquid ports, as the case may be. The lever by the upward movement again assumes a position to be actuated by the next dog on the rotating disk. This rotation of the four-way valve is effective at the relative times for appropriately opening and closing their several ports.

The springs 175, are connected to their respective valve handles by means of rods 175′, which are hinged to the handles as illustrated, adapted through energy of the springs to strongly force the valve handles upward.

As means for driving the shaft 34, that actuates the cam mechanism which operates the scoop pipe 29, I mount on the extended end of the shaft 157, (Figs. 1, 2 and 12), a beveled gear wheel 176, engaging a similar beveled gear wheel 177, which is carried by a shaft 178, suitably journaled and supported on the standard 179. On the upper end of the shaft 178, there is also provided a gear wheel 180, meshing with a gear wheel 181, on the end of the shaft 34, which is carried by a journal box 182, on the upper end of the standard 179, so that, through rotation of the shaft 178, the shaft 34, will be revolved and the scoop pipe will thereby be operated in step and in harmony with the other members that are actuated by the general control mechanism of the separating apparatus. The gear wheels 176, 177, 181, and 180, are suitably proportioned to procure the rotation of the parts they drive, as desired.

From the fact, as above stated, that it is advantageous and at times necessary when different materials are being treated, to change the speed of rotation of the control mechanism without changing the speed of the separating vessel, and also at times to change both the speed of the separating vessel and the control mechanism, and further, to secure necessary conjoint operation of the parts of my separating apparatus and maintain their several movements relatively in step, I provide a suitable shaft 183, which is most clearly illustrated in Fig. 23, and which is also shown in Figs. 24 and 25 of the drawings. This shaft, 183, is mounted in suitable journal boxes 184 and 185, respectively, which are supported on brackets 186 and 187, and on one end of the shaft in suitable position is mounted a pulley 188, which is connected by a belt 189, (Figs. 23 and 25) to a pulley 190, (Figs. 1 and 25) which is mounted on the main driving shaft 37.

Near the opposite end of the shaft 183, to which the pulley 188 is attached, I provide a cone-shaped pulley, of considerable length, 191, and have connected this pulley by a belt 192, to a corresponding cone-shaped pulley 193, which is mounted on a shaft 194, that is journaled in boxes 195 and 196, and to one end of this shaft 194 is attached a suitable pulley, 197 which carries a belt 198 that passes over the pulley 166, in a manner to impart rotation to the latter pulley as the belt is traveled.

To hold the belt 192 in desired position on the cone-shaped pulleys 191 and 193, I provide a guide rod 199, having guide fingers 200, between which the belt 192 passes, and to shift the position of the belt, the rod 199 is traveled or slid through a guide part 201, which maintains it in position; thereby, through the guide fingers 200, the belt on the cone-pulleys is traveled in one direction or the other longitudinally of such pulleys, resulting in effecting a greater or less speed of rotation, as desired, of the pulley 166, and of the general control mechanism of the separating apparatus. It will be seen that in this way the control mechanism will be driven by the same power agency that actuates the other parts of my separating apparatus, and that variation may be had in this control mechanism without the speed of other parts of my apparatus being varied, through the instrumentality of the interposed variable speed means. Through these agencies the cycles of operation of the separating apparatus and the predetermined times of movement may be changed and varied without changing the speed of the separating vessel, or when the speed of the vessel is changed by variation in speed of rotation of the main driving shaft, 37, the cycle of operating movements of the separating apparatus may be maintained constant by suitably changing the conditions in the variable speed mechanism.

While I have illustrated and described my invention with much minutia, there may be a considerable structural and assemblage latitude indulged, and still come within the essence and scope of my invention, and therefore I do not mean to confine myself to the exact details herein set forth, and in the use of the words hydrostatic and hydraulic, in the specification and claims, I wish it understood as including the use of liquid either in motion or at rest, or in both states.

What I regard as new and desire to secure by Letters Patent is:

1. In a centrifugal ore separating apparatus, having a rotatable separating vessel adapted to intermittently discharge tailings and concentrates, the combination of a movable launder containing compartments adapted to receive said tailings and concentrates separately, automatic means embodying hydrostatic mechanism adapted to move said launder into position to receive the tailings and concentrates in their respective compartments, automatic means embodying hydrostatic mechanism adapted to intermittently change the speed of rotation of said vessel and variable control means adapted to govern the supply of actuating liquid to the hydrostatic mechanism, substantially as described.

2. In a centrifugal ore separating apparatus, having a rotatable separating vessel adapted to intermittently discharge tailings and concentrates, the combination of a movable launder containing compartments adapted to receive said tailings and concentrates separately, automatic means embodying hydraulic agencies adapted to move said launder into position to receive said tailings and concentrates in their respective compartments, automatic means adapted to intermittently change the speed of rotation of the vessel embodying tight and loose pulleys with belts thereon, and automatic means for shifting said belts embodying hydrostatic and centrifugally actuated agencies, substantially as described.

3. In a centrifugal ore separating apparatus, having a rotatable separating vessel adapted to intermittently discharge tailings and concentrates, the combination of a launder adapted to receive said tailings and concentrates, means for introducing pulp into said vessel, means for introducing concentrate removing water into said vessel, automatic means adapted to start and stop the introduction of said pulp and water, automatic means to intermittently change the speed of rotation of the vessel embodying hydrostatic agencies and variable control mechanism adapted to govern the supply of actuating liquid to the hydrostatic agencies, substantially as described.

4. In a centrifugal ore separating apparatus, having a rotatable separating vessel adapted to intermittently discharge tailings and concentrates, the combination of a movable launder containing compartments adapted to receive said tailings and concentrates separately, automatic means adapted to move said launder into positions to receive said tailings and concentrates in their respective compartments while being discharged, embodying hydraulic agencies adapted to actuate said launder moving means, and control means adapted to govern the supply of actuating liquid to said hydraulic agencies at predetermined times, substantially as described.

5. In a centrifugal ore separating apparatus, having a rotatable separating vessel adapted to intermittently discharge tailings and concentrates, the combination of a movable launder containing compartments adapted to receive said tailings and concentrates separately, automatic means adapted to move said launder into positions to receive the tailings and concentrates in their respective compartments, automatic means adapted to intermittently change the speed of said vessel, hydraulic means adapted to actuate the launder moving means and hydraulic means adapted to actuate the launder moving means and hydraulic mechanism adapted to actuate the means for changing the speed of the vessel, substantially as described.

6. In a centrifugal ore separating apparatus, having a rotatable separating vessel adapted to intermittently discharge tailings and concentrates, the combination of a movable launder having compartments adapted to receive said tailings and concentrates separately, automatic means adapted to move said launder into positions to receive said tailings and concentrates in their respective compartments while being discharged, hydraulic mechanism adapted to actuate said launder moving means embodying valve mechanism and variable automatic means adapted to operate said valve mechanism at predetermined times, substantially as described.

7. In a centrifugal ore separating apparatus, having a rotatable separating vessel adapted to intermittently discharge tailings and concentrates, the combination of a movable launder having compartments adapted to receive said tailings and concentrates separately, automatic means adapted to move said launder into positions to receive the tailings and concentrates in their respective compartments, hydraulic mechanism adapted to actuate said launder moving means embodying governing valve mechanism, and automatic control means provided with relatively variable actuating members adapted to effect operation of said valve mechanism at predetermined times, substantially as described.

8. In a centrifugal ore separating apparatus, having a rotatable separating vessel adapted to intermittently discharge tailings and concentrates separately, the combination of a movable launder containing compartments adapted to receive said tailings and concentrates separately, automatic means adapted to move said launder into positions to receive the tailings and concentrates in their respective compartments embodying hydraulic mechanism adapted to actuate said launder moving means, said hydraulic mechanism embodying liquid valves, automatic means adapted to operate said liquid governing valves, provided with relatively variable actuating members adapted to effect operation of said valves at predetermined times and means adapted to vary the speed of rotation of the vessel, substantially as described.

9. In a centrifugal ore separating apparatus having a rotatable separating vessel adapted to intermittently discharge tailings and concentrates, the combination of a movable launder containing compartments adapted to receive said tailings and concentrates separately, automatic means adapted to move said launder into positions to receive the tailings and concentrates in their respective compartments, embodying a hydraulic member adapted to actuate said launder moving means, means for introducing pulp and concentrate the moving water into the vessel, automatic means for stopping and starting the flow of such pulp and water, means adapted to vary the rotating speed of the vessel, a hydraulic member for actuating the speed varying means, valve mechanism for governing the movements of the hydraulic member, and means to effect operation of said valve mechanism at predetermined times, substantially as described.

10. In a centrifugal ore separating apparatus, having a rotatable separating vessel containing an expansible and contractible separating friction element, and adapted to intermittently discharge tailings and concentrates the combination of a movable launder containing compartments adapted to receive said tailings and concentrates separately, automatic means adapted to move said launder into positions to receive the tailings, and concentrates in their respective compartments, hydraulic mechanism adapted to actuate said launder moving means embodying governing valve mechanism, automatic means adapted to operate said governing valve mechanism at predetermined times, provided with relatively variable actuating members, means for introducing pulp and concentrate-removing water into the vessel, automatic means for stopping and starting the flow of such pulp and water, means for introducing expanding water into the expansible friction member, travelable means for removing water from said expansionable member, and means adapted to transmit traveling movement to said expansion water removing means synchronously with said valve governing mechanism, substantially as described.

11. In a centrifugal ore separating apparatus, embodying a rotatable separating vessel adapted to be intermittently varied in speed of rotation during operation and to intermittently discharge tailings and concentrates, a launder having multiple compartments to receive said tailings and concentrates separately and adapted to be intermittently moved into relative positions to receive said tailings and concentrates, means for effecting said movements of the launder, and means for effecting change of speed of rotation of the vessel, in combination with hydraulic members actuating said means for changing the speed of the vessel, hydraulic members actuating said means for moving the launder and variable means adapted to govern the time of relative movements of the hydraulic members substantially as described.

12. In a centrifugal ore separating apparatus embodying a rotatable separating vessel adapted to be intermittently varied in speed of rotation during operation and to intermittently discharge tailings and concentrates, an expansible friction member within said vessel adapted to be expanded by liquid pressure, means for introducing expanding liquid within said member, travelable means for removing expanding liquid from said member, an element effecting movement of said travelable means, a launder having multiple compartments to receive said tailings and concentrates separately and adapted to be intermittently moved in relative positions to receive the tailings and concentrates, means adapted to introduce pulp and concentrate-removing water into the separating vessel, and means for effecting change of rotating speed of the vessel in combination with hydraulic members actuating the means for changing the speed of rotation, hydraulic members actuating said means for moving the launder and variable means adapted to automatically govern the time of relative movements of the hydraulic members, substantially as described.

13. In a centrifugal ore separating apparatus, having a rotatable separating vessel adapted to intermittently discharge tailings and concentrates, the combination of a movable launder having compartments adapted to receive said tailings and concentrates separately, automatic means embodying hydraulic mechanism adapted to move said launder into position to receive the tailings and concentrates in their respective compartments, automatic means embodying hydraulic mechanism adapted to intermittently change the speed of rotation of the vessel, variable control means adapted to govern the supply of actuating liquid to the hydraulic mechanism and power transmission agencies adapted to actuate said control means embodying variable speed devices, interposed between said control means and the prime mover of the separating apparatus, adapted to relatively vary the length of operating cycles of the separating apparatus, substantially as described.

14. In a centrifugal ore separating apparatus, having a rotatable separating vessel adapted to intermittently discharge tailings and concentrates, the combination of a movable launder having compartments adapted to receive said tailings and concentrates separately, automatic means adapted to move said launder into position to receive the tailings and concentrates in their respective compartments while being discharged, hydraulic agencies adapted to actuate said launder moving means, control means adapted to govern the supply of actuating liquid to said hydraulic agency at predetermined times and power transmission agencies to actuate said control means embodying variable speed devices interposed between said control means and the prime mover of the separating apparatus and adapted to change the periods of predetermined times, substantially as described.

15. In a centrifugal ore separating apparatus, having a rotatable separating vessel adapted to intermittently discharge tailings and concentrates, the combination of a movable launder having compartments adapted to receive said tailings and concentrates separately, automatic means adapted to move said launder into positions to receive the tailings and concentrates in their respective compartments, hydraulic mechanism adapted to actuate said launder moving means embodying governing valve mechanism, automatic control means provided with variable actuating members adapted to effect operation of said valve mechanism at predetermined times and means adapted to transmit actuating power to said control means being adapted to vary the cycles of movements and the predetermined times of such movements of the separating apparatus, substantially as described.

PHILIP F. PECK.

Witnesses:
N. W. COLLINS,
JOHN G. CAMPBELL.